United States Patent [19]
Izumiya et al.

[11] Patent Number: 5,978,170
[45] Date of Patent: Nov. 2, 1999

[54] RECORDING/REPRODUCING APPARATUS AND SERVO-INFORMATION RECORDING METHOD

[75] Inventors: Yasunori Izumiya; Gen Ohshima; Taturo Sasamoto, all of Kawasaki, Japan

[73] Assignee: Fujitsu Limited, Kawasaki, Japan

[21] Appl. No.: 08/865,552

[22] Filed: May 29, 1997

Related U.S. Application Data

[62] Division of application No. 08/529,503, Sep. 18, 1995, abandoned.

[30] Foreign Application Priority Data

Jan. 30, 1995 [JP] Japan .................................. 7-013179

[51] Int. Cl.⁶ .............................. G11B 5/596; G11B 5/09
[52] U.S. Cl. .................................... 360/77.08; 360/78.14; 360/49; 360/51
[58] Field of Search .................................. 360/63, 78.14, 360/77.08, 47, 48, 49, 53, 51

[56] References Cited

U.S. PATENT DOCUMENTS

| | | | |
|---|---|---|---|
| 4,495,533 | 1/1985 | Chambers | 360/72.2 |
| 4,933,786 | 6/1990 | Wilson | 360/78.14 |
| 5,047,880 | 9/1991 | Ohno | 360/78.14 |
| 5,068,755 | 11/1991 | Hamilton et al. | 360/72.2 X |
| 5,132,854 | 7/1992 | Tsuyoshi | 360/78.14 |
| 5,162,954 | 11/1992 | Miller | 360/72.2 |
| 5,193,036 | 3/1993 | Green | 360/78.14 |
| 5,231,545 | 7/1993 | Gold | 360/49 |
| 5,596,460 | 1/1997 | Greenberg et al. | 360/78.14 |
| 5,768,044 | 6/1998 | Hetzler et al. | 360/78.14 X |

FOREIGN PATENT DOCUMENTS

| | | | |
|---|---|---|---|
| 73568 | 3/1990 | Japan | 360/78.14 |
| 2-304784 | 12/1990 | Japan . | |
| 6-96560 | 4/1994 | Japan . | |

*Primary Examiner*—Alan Faber
*Attorney, Agent, or Firm*—Greer, Burns & Crain, Ltd.

[57] ABSTRACT

An index determining unit determines that a current position in a disk medium corresponds to a true index when reaching a true index pattern of servo information recorded in the disk medium. The determination is used for reading predetermined servo information so as to perform a servo control operation of a disk reading/writing head. The disk medium has the true index pattern in a first portion of the disk medium and also untrue index patterns of servo information in a predetermined number of second portions in proximity to the first portion along a track direction. The true index pattern and the untrue index patterns form a predetermined sequence. The index determining unit comprises a reading unit for reading the servo information recorded in the disk medium; a storing unit for storing the read servo information in series; and a determining unit for determining that a current position in the disk medium corresponds to the true index when the stored servo information includes a sequence which is different from the predetermined sequence by a predetermined error.

6 Claims, 20 Drawing Sheets

FIG. 3
PRIOR ART

INDEX ▽

(HEAD 14₀) TRK0 : 0.0 | 0.4 ... 0.1C | 1.0
(HEAD 14₁) TRK1 : 0.1 | 0.5 ... 0.1D | 1.1
(HEAD 14₂) TRK2 : 0.2 | 0.6 ... 0.1E | 1.2
(HEAD 14₃) TRK3 : 0.3 | 0.7 ... 0.1F | 1.3

|  | n | n-1 | n-2 | n-3 |
|---|---|---|---|---|

FIG. 8A    SREG 3 9

| 3 | 3 | 3 | 3 |
|---|---|---|---|

FIG. 8B    SREG 3 9

| 2 | 3 | 3 | 3 |
|---|---|---|---|

FIG. 8C    SREG 3 9

| 1 | 2 | 3 | 3 |
|---|---|---|---|

FIG. 8D    SREG 3 9

| 0 | 1 | 2 | 3 |
|---|---|---|---|

FIG. 8E    SREG 3 9

| 3 | 0 | 1 | 2 |
|---|---|---|---|

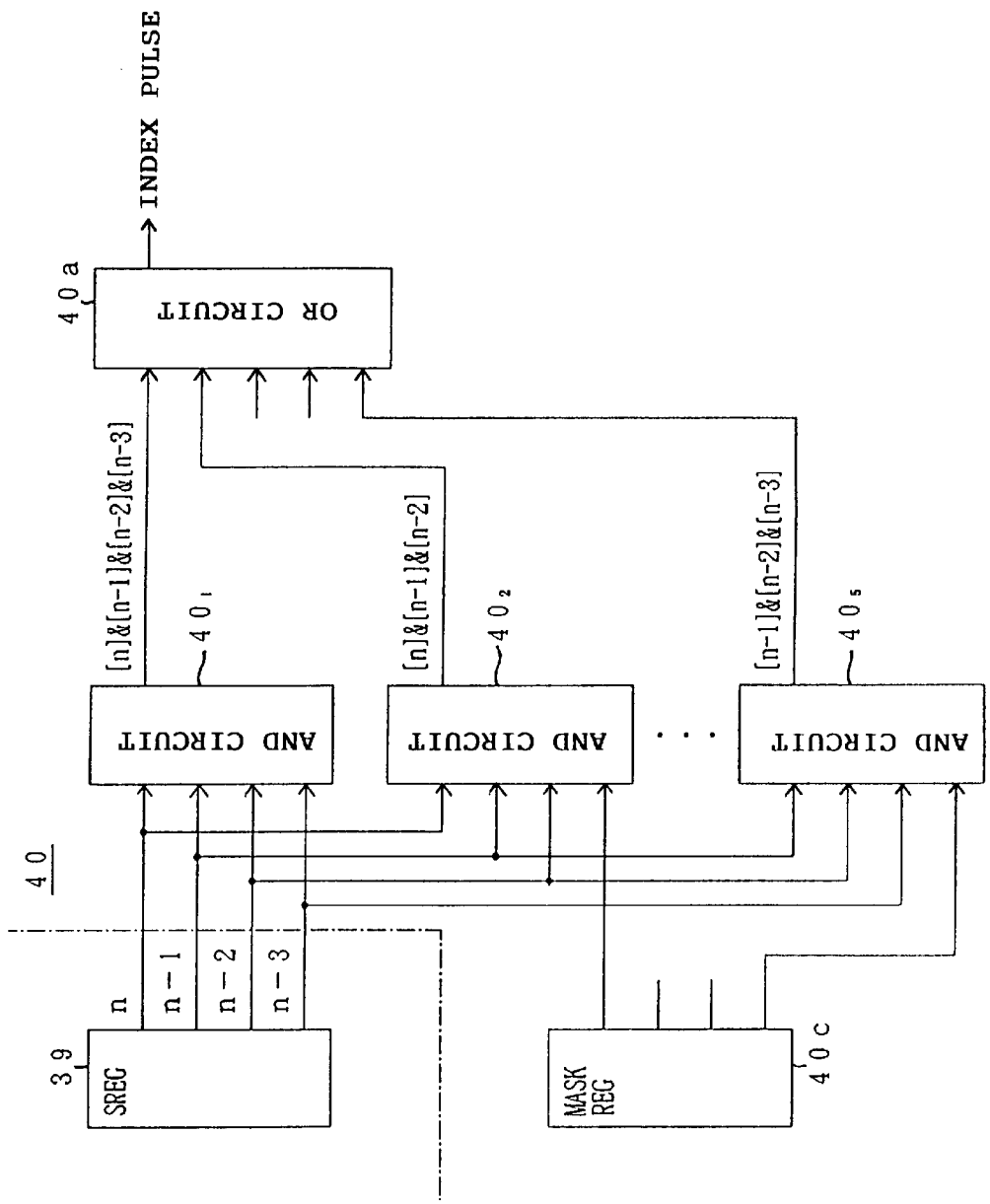

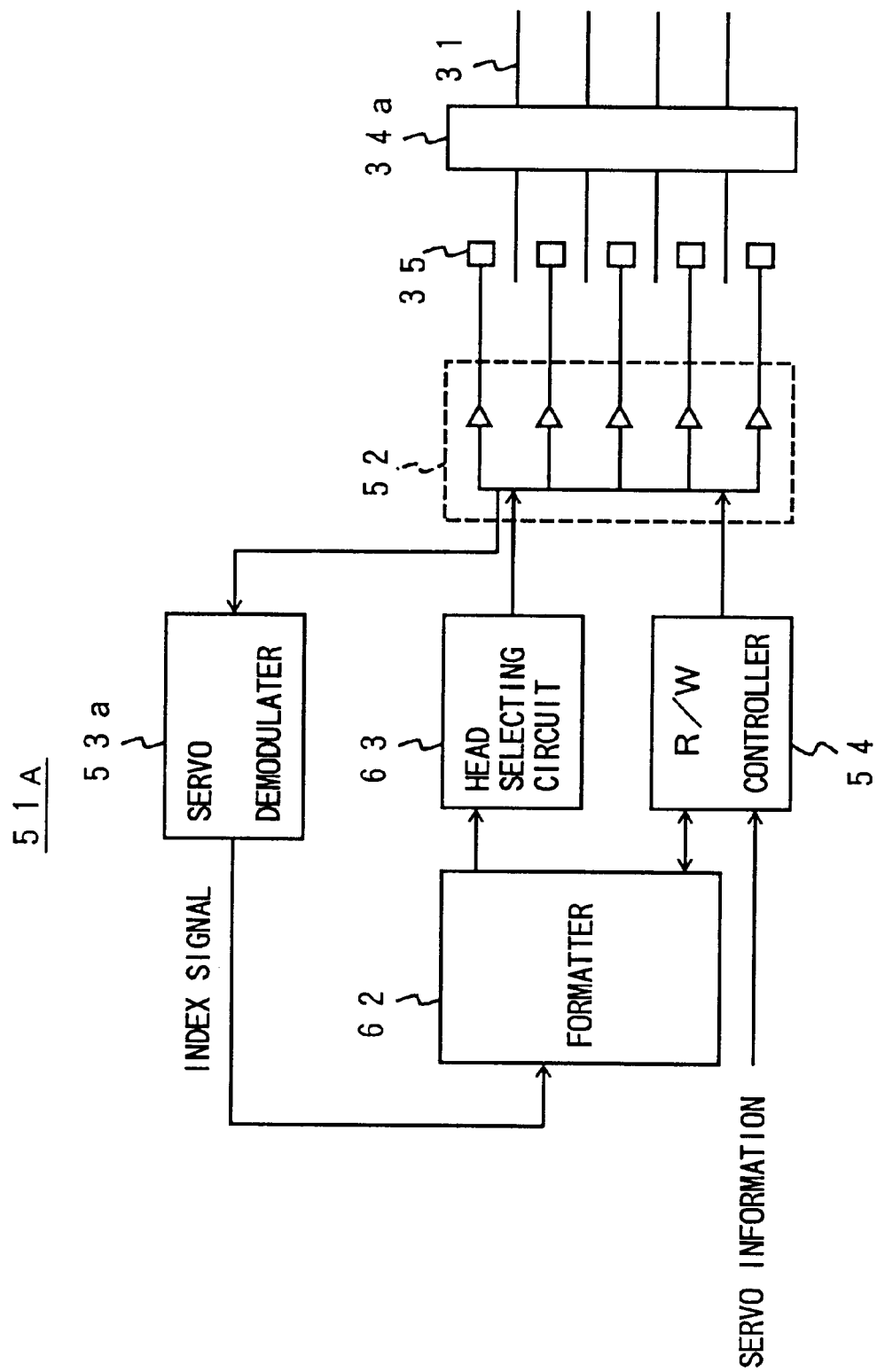

| DETERMINING POSITION NUMBER | HEAD NUMBER |
|---|---|
| 2 | 0 |
| 6 | 1 |
| m | n |

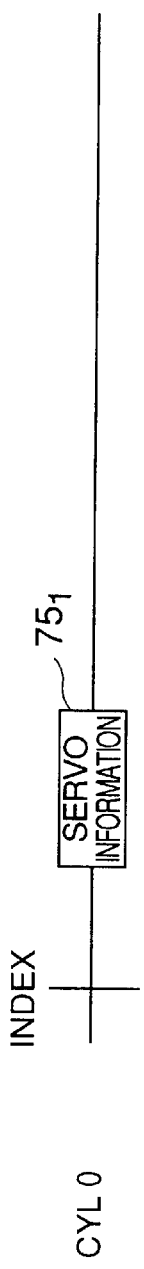
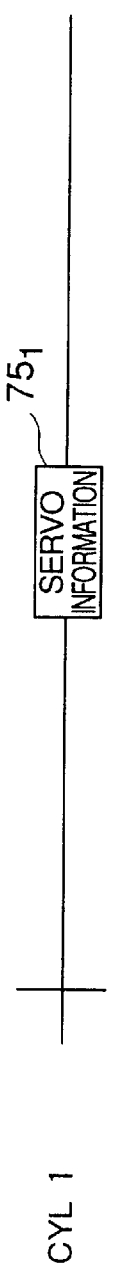
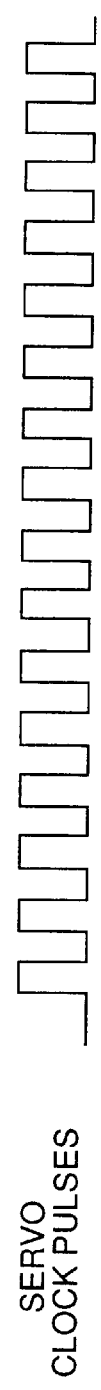
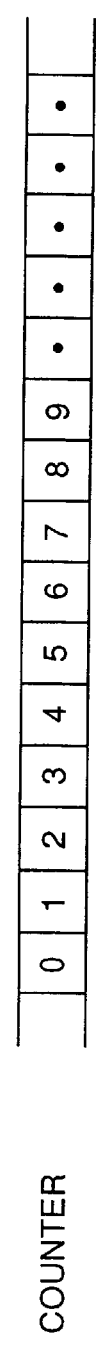
FIG.18A  CYL 0
FIG.18B  CYL 1
FIG.18C  SERVO CLOCK PULSES
FIG.18D  COUNTER
FIG.18E  SERVO DETERMINATION 0 (CYL 0)
FIG.18F  SERVO DETERMINATION 1 (CYL 1)

FIG. 19

| DETERMINATION POSITION NUMBER | CYLINDER NUMBER |
|---|---|
| 2 | 0 |
| 6 | 1 |
| ~ | ~ |
| m | n |

76

RECORDING/REPRODUCING APPARATUS AND SERVO-INFORMATION RECORDING METHOD

This application is a divisional of application Ser. No. 08/529,503 filed on Sep. 18, 1995, now abandoned.

BACKGROUND OF THE INVENTION

1. Field of the Invention

The present invention relates to a recording/reproducing apparatus for recording servo information on a disk medium, and then reading the servo information and performing servo control of a head.

Recently, due to the increased amount of information being processed in computer systems, the amount of information to be stored in a magnetic disk apparatus has increased. Therefore, miniaturization and increased storage capacities of storage media of information storage apparatuses are required. Further, high-density storage media and high-performance recording/reproducing apparatuses are demanded.

2. Description of the Related Art

FIG. 1 shows a plan view of one example of a magnetic disk apparatus in the related art. In the magnetic disk apparatus 11, an actuator 12 includes a predetermined number of arms 13 each of which has a magnetic head 14 at a projecting end thereof via a supporting-spring mechanism 13a. A base of each arm 13 is pivotably supported by a pivot 15.

A rotational supporting unit 16 is provided at the other end of the arm 13. A coil 17 is wound on the rotational supporting unit 16. Magnets 18a and 18b are fixed below the coil 17. A VCM (Voice Coil Motor) is formed by the coil 17 and magnets 18a and 18b.

A predetermined number of magnetic disks 20 are fixed onto a spindle 19 of a sensor-less spindle motor (not shown in the figure) and are rotated. In the actuator 12, an electric current flows through the coil 17 via a circuit substrate 21 and a flexible print board 22, and thus the arms 13 are rotated so that each of the heads 14 moves along a radial direction of each of the disks 20.

In this magnetic disk apparatus 11, a seeking control is performed for positioning the magnetic heads 14 at predetermined tracks in the magnetic disks 20. This seeking control is performed in a closed-loop servo control method in which servo information previously recorded on the magnetic disks 20 is read for the seeking control.

A servo-area servo method and a data-area servo method are included in the servo control method. In the servo-area servo method, a magnetic disk which has the servo information recorded in a special servo area in the disk is used. In the data-area servo method, a magnetic disk which has the servo information recorded in a data area in the disk is used.

The servo information is recorded in each track or each sector in the magnetic disks 20 at predetermined positions common to the magnetic disks 20. In order to read predetermined servo information from the magnetic disks 20, an index recorded in each track of each of the magnetic disks 20 is previously detected, index detection thus being performed. A recording position of the servo information and then positions of the magnetic heads 14 are detected based on the detected index.

FIG. 2 illustrates an index pattern in a magnetic disk in the related art. FIG. 2 shows a case of a sector servo method in which sector servo information 24 is recorded in each sector of a predetermined track in the magnetic disk 20. The sector servo information 24 is recorded, for example, in an AGC (Automatic Gain Control information) region $24_1$, in an SM (Servo Mark information) region $24_2$, an ID and INDEX (writing and reading index information) region $23_3$, and a POSITION (position information) region $24_4$ shown in FIG. 2.

Sector servo numbers (for example, 0 through 60) and an index pattern are recorded in the ID and INDEX region $24_3$. The index pattern is formed by a pattern in which "0" is allocated for a position at which the sector number is "0" and "1" is allocated for the other positions. The "0" in the index pattern acts as an index, and an index pulse is generated when "0" is detected. Thus, the above-mentioned index detection is performed.

Servo information is recorded in each of the magnetic disks 20 in a manner in which positions at which the servo information are recorded overlap one another between recorded tracks of the disks 20.

FIG. 3 shows a spatial relationship of the positions between disks 20 in the related art at which the servo information is recorded. FIG. 3 shows an example disclosed in Japanese Laid-Open Patent Application No. 2-304784. In this example, the servo information is recorded in the tracks TRK0 through TRK3 of the disks 20 in a manner in which the positions at which the servo information is recorded overlap one another between the tracks TRK0 through TRK3 of the disks 20 in a time series manner. When servo information is recorded or written in sectors (0, 0), (0, 1), (0, 2), and (0, 3) of the tracks TRK0 through TRK3 shown in the figure, a head $14_0$ selected from the magnetic heads 14 writes the servo information to the sector (0, 0) of the track TRK0. Then, after the completion thereof, a head $14_1$ selected from the magnetic heads 14 writes the servo information to the sector (0, 1) of the track TRK1. Thus, after completion of servo-information writing to one sector, servo-information writing to a subsequent sector is performed. In this manner, the servo information is written to the four sectors (0, 0) through (0, 3).

In the related art, as shown in FIG. 2, one index pattern is provided for the relevant servo information, and the index detection is performed by detecting only the one index pattern. Therefore, if the one index pattern is missing for some reason, an index error occurs and any normal operation cannot be performed until a subsequent index pattern is appropriately detected. Thus, performance of the magnetic disk apparatus is degraded.

Further, redundancy is not sufficiently high if only one index pattern is provided for the relevant servo information. Therefore, an index detection margin is not sufficiently high and thus performance degradation may also occur by this cause.

Further, in the related art, as shown in FIG. 3, the positions of the relevant servo information overlap one another between the tracks of the disks. Therefore, after the completion of servo-information writing on a sector of a track of a magnetic disk, it is necessary to wait for approximately one rotation of the disks 20 before starting servo-information writing to a sector of a track of a subsequent disk. As a result, the time required for writing the desired whole servo information and for verifying it for the entirety of the disks 20 is a considerably long time. In fact, this time results from multiplying the time required for writing the servo information for one track by the number of servo frames for each track and then multiplying this result by the number of cylinders of the disks 20. Thus, the servo-information writing or recording work is troublesome.

SUMMARY OF THE INVENTION

An object of the present invention is to provide a recording/reproducing apparatus in use of which the index detection margin can be improved, the time required for the servo-information recording and verifying can be reduced, and thus the performance of the apparatus can be improved.

A recording/reproducing apparatus according to the present invention comprises:

index determining means for determining that a current position in a disk medium corresponds to a true index when reaching a true index pattern of servo information recorded in said disk medium, the determination being used for reading predetermined servo information so as to perform a servo control operation of a disk reading/writing head;

said disk medium having said true index pattern in a first sector of said disk medium and also untrue index patterns of servo information in a predetermined number of second sectors in proximity to said first sector along a track direction, said true index pattern and said untrue index patterns forming a predetermined sequence; and said index determining means comprising:

reading means for reading the servo information recorded in said disk medium;

storing means for storing the read servo information in series; and determining means for determining that a current position in said disk medium corresponds to said true index when the stored servo information includes a sequence which is different from said predetermined sequence by a predetermined error.

It is preferable that said predetermined sequence comprises an arithmetic progression formed of numbers represented by said true index pattern and said untrue index patterns.

In the apparatus, a current position in the disk medium can be determined to correspond to the true index when the stored servo information includes a sequence which is different from said predetermined sequence by a predetermined error. Thus, if a small error is included in the read index patterns, it is possible to determine that the index patterns include the true index. As a result, it is possible to improve an index detecting margin and thus to improve an index detecting efficiency.

It is preferable that said determining means determines that a current position in said disk medium corresponds to said true index when the stored servo information includes a sequence which is equal to said predetermined sequence.

Further, it is also preferable that said determining means determines that a current position in said disk medium does not correspond to said true index when the stored servo information includes a sequence which is different from said predetermined sequence by a predetermined error.

Further, it is also preferable that said determining means comprises a table which stores conditions to be used for determining that a current position in said disk medium corresponds to said true index when the stored servo information includes sequences, each of which is different from said predetermined sequence by a predetermined error.

Further, it is also preferable that said determining means comprises means for inputting the serially stored servo information in parallel.

Thereby, it is possible to determine the read index patterns includes the true index pattern when the read index patterns completely agree with a reference pattern, and when the read index patterns include a predetermined error. Further, it is also possible to determine that the read index pattern does not include the true index pattern when the read index patterns include a predetermined error. As a result, it is possible to adaptively perform the index determining operation.

A recording/reproducing apparatus according to another aspect of the present invention comprises:

reading means for reading servo information from a predetermined number of disk media, said predetermined number of disk media having said servo information recorded therein in a manner in which a position at which said servo information is recorded in each of said predetermined number of disk media is shifted, when a relevant disk medium is changed, by a distance corresponding to a head switching time; and servo control means for performing a servo control operation of a predetermined number of heads for said predetermined number of disk media, using said servo information read from said predetermined number of disk media.

It is preferable that the recording of the servo information in each of said predetermined number of disk media is performed in a manner in which the servo information recorded in each of said predetermined number of disk media through a relevant one of said predetermined number of heads includes a head number which is updated every head switching time.

Further, a servo information recording method according to the present invention comprises steps of:

a) obtaining an index signal from a predetermined number of disk media;

b) producing a servo-information writing-position signal in response to said index signal;

c) writing servo information in each of said predetermined number of disk media through a respective one of a predetermined number of heads at a position indicated by said servo-information writing-position signal; and d) switching from one to another one among said predetermined number of heads after writing the servo information in each of said predetermined number of disk media in the step c).

Thereby, it is possible to perform recording of the servo information or verifying the recorded servo information through all the heads in all the disk media within a time corresponding to one turn of the disk media. Thus, it is possible to improve an operation efficiency in recording the servo information and verifying the recorded servo information.

It is preferable to further comprise head number determining means for determining which one of said predetermined number of heads is used for currently reading the servo information.

Further, it is preferable that said head number determining means determines which one of said predetermined number of heads is used for currently reading the servo information, using a time interval between a time an index included in the servo information is reached and a time currently read servo information is reached.

Further, it is preferable that said head number determining means determines which one of said predetermined number of heads is used for currently reading the servo information, using a time interval between a time previously read servo information is reached and a time currently read servo information is reached.

Thereby, it is possible to omit, from the servo information, information indicating head numbers. Thus, it is possible to simplify the contents of the servo information.

A recording/reproducing apparatus according to another aspect of the present invention comprises:

reading means for reading servo information from a predetermined number of cylinders provided in a disk medium, said predetermined number of cylinders having said servo information recorded therein in a manner in which a position at which said servo information is recorded in each of said predetermined number of cylinders is shifted by a predetermined interval when a relevant cylinder is changed; and servo control means for performing a servo control operation of a reading/writing head, using said servo information read from said predetermined number of cylinders.

It is preferable to further comprise cylinder number determining means for determining from which one of said predetermined number of cylinders the servo information is currently being read.

Further, it is preferable that said cylinder number determining means determines from which one of said predetermined number of cylinders the servo information is currently being read, using a time interval between a time an index included in the servo information is reached and a time currently read servo information is reached.

Further, it is preferable that said cylinder number determining means determines from which one of said predetermined number of cylinders the servo information is currently being read, using a time interval between a time previously read servo information is reached and a time currently read servo information is reached.

Thereby, it is possible to omit, from the servo information, information indicating cylinder numbers. Thus, it is possible to simplify the contents of the servo information.

It is preferable that:

said predetermined number of cylinders is divided into a predetermined number of blocks; and the recording of said servo information in each block of said predetermined number of blocks is performed in a manner in which a position at which said servo information is recorded in each cylinder is shifted, by a predetermined interval when a relevant cylinder is changed.

Thereby, even if a number of the cylinders included in the disk medium is increased, an efficient servo-information managing can be performed.

Other objects and further features of the present invention will become more apparent from the following detailed description when read in conjunction with the accompanying drawings.

BRIEF DESCRIPTION OF THE DRAWINGS

FIG. 3 illustrates a spatial relationship of the servo information recorded in magnetic disks in the related art;

FIGS. 7, 8A, 8B, 8C, 8D and 8E illustrate an index determining method according to the first embodiment of the present invention;

FIG. 10 shows a block diagram of another index determining construction according to the first embodiment of the present invention;

FIG. 11 shows a block diagram of part of a magnetic disk apparatus in a second embodiment of the present invention;

FIG. 16 illustrate a head-number table used in the head-number determining operation;

FIGS. 18A, 18B, 18C, 18D, 18E and 18F illustrate a cylinder-number determining operation in the fourth embodiment;

FIG. 19 illustrate a cylinder-number table used in the cylinder-number determining operation.

DESCRIPTION OF PREFERRED EMBODIMENTS

Figure 4:
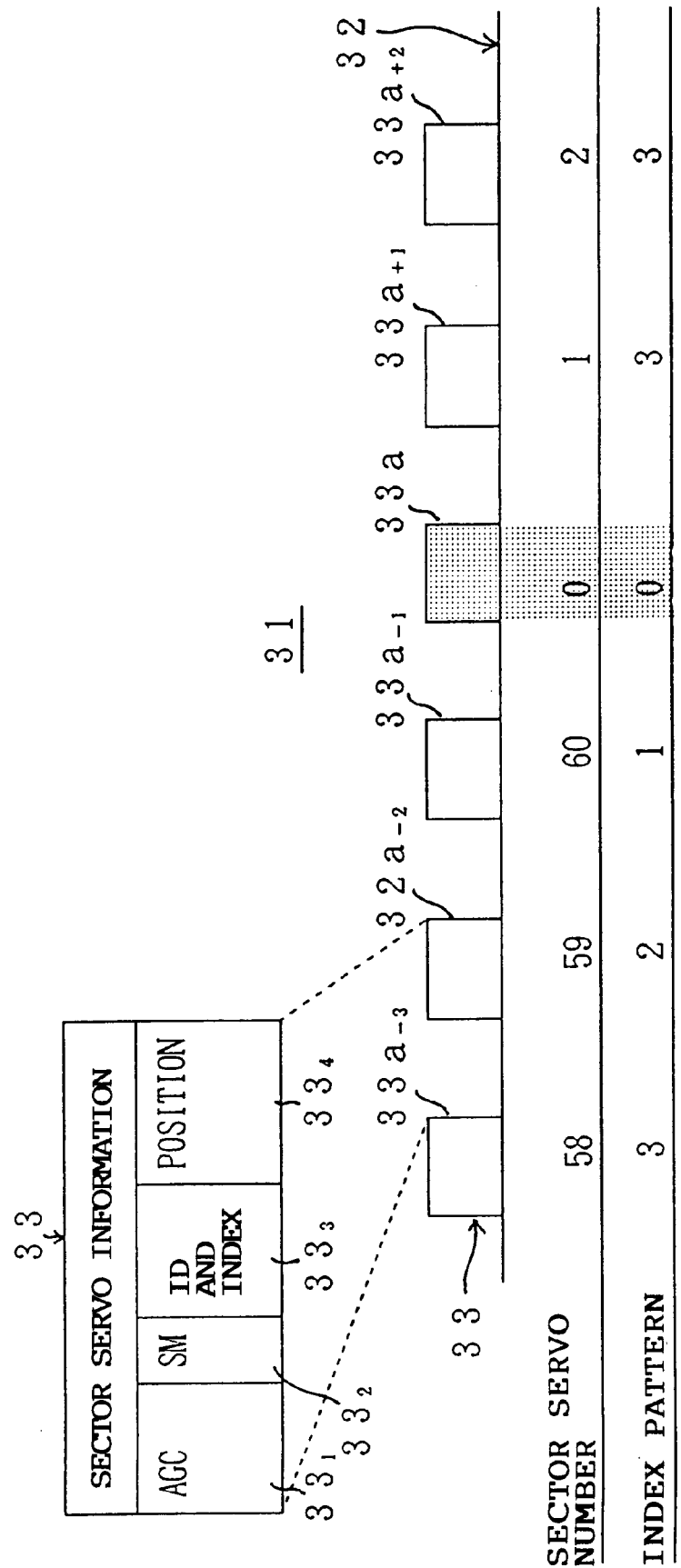
FIG. 4 illustrates index patterns recorded in a magnetic head according to a first embodiment of the present invention.

FIG. 4 shows servo information recorded in a predetermined track 32 in a magnetic disk 31 as a disk medium according to a first embodiment of the present invention. FIG. 4 shows a case of the sector servo method in the data-area servo method. However, the first embodiment can also be applied to the servo-area servo method.

In FIG. 4, as mentioned above, as in the sector servo method, the sector servo information 33 is recorded in each sector of a predetermined track 32 of the magnetic disk 31. The sector servo information 33 is recorded, for example, in an AGC (Automatic Gain Control information) region $33_1$, in an SM (Servo Mark information) region $33_2$, in an ID and INDEX (writing and reading index information) region $33_3$, and in a POSITION (position information) region $33_4$.

Sector servo numbers (for example, 0 through 60) and an index pattern are recorded in the ID and INDEX region $33_3$. The index pattern is formed of index information of each sector servo information 33. The index pattern is formed by a pattern in which a reference position is referred to as a true index. The reference position is, for example, a position at which the relevant sector servo number is "0", and an index signal "0" (recorded in 2-bit binary information, and the same hereinafter) is recorded at the true index in the index pattern, as shown in FIG. 4.

As shown in the figure, an index signal "1" (at a position corresponding to the sector servo number '60') and an index signal "2" (at a position corresponding to the sector servo number '59') are recorded as untrue index information. These index signals "1" and "2" are recorded in proximity of the sector servo information 33a including the index signal "0" along a track 32 direction, and they are recorded in the ID regions $33_3$ of the sector servo information $33a_{-1}$ and $33a_{-2}$ along a disk 31 rotation direction. Further, an index signal "3" as untrue index information is recorded in the ID region $33_3$ in sector servo information $33a_{-3}$, $33a_{-4}$, ... of each of all sectors in the same track 32. Thus, along the rotation of the magnetic disk 31, a number indicated by the index signal is decremented (from "3" to "2" and then to "1", as shown in FIG. 4) in the index pattern as the true index position is approached.

Figure 5:
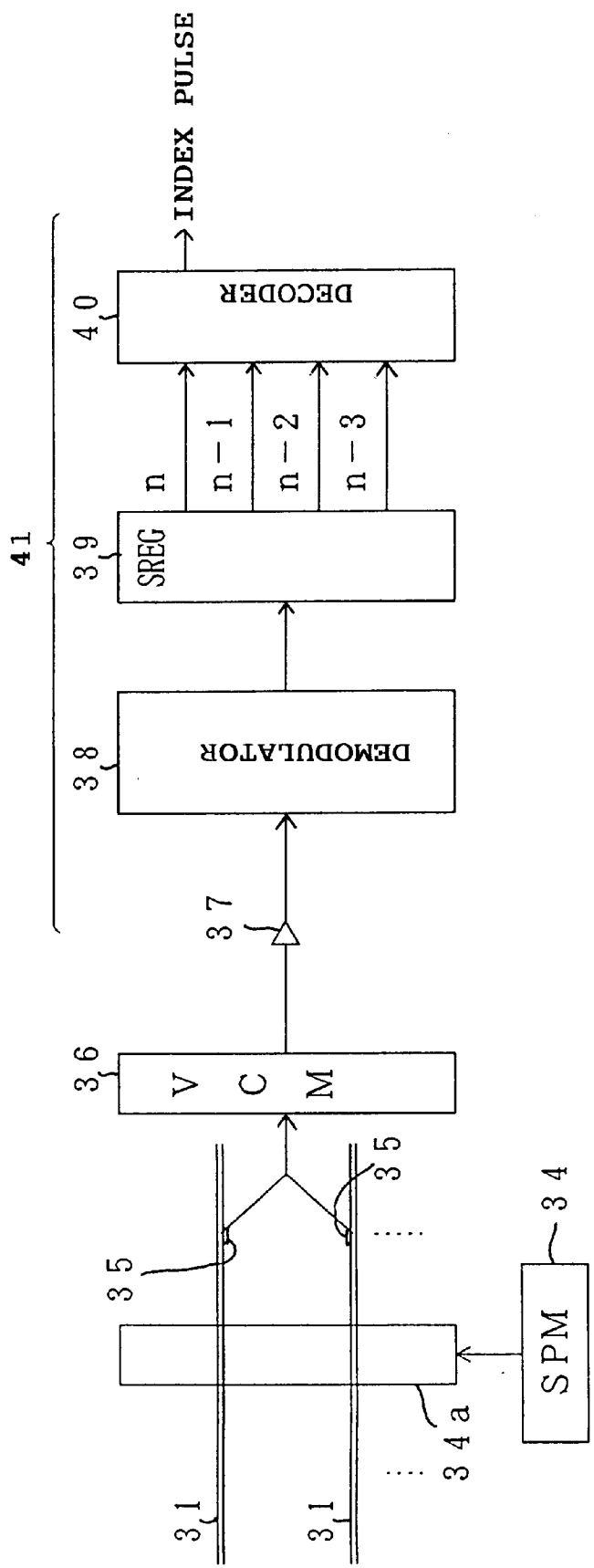
FIG. 5 shows a block diagram of an index determining construction according to the first embodiment of the present invention.

FIG. 5 shows a block diagram of a construction for detecting the true index shown in FIG. 4. The construction shown in FIG. 5 is part of a magnetic disk apparatus which will be described later. A plurality (2, in FIG. 5) of magnetic disks 31 are mounted to a spindle 34a which is rotated by a spindle motor (SPM) 34. A relevant one of magnetic heads 35 is provided to each one of the plurality of magnetic disks 31. The magnetic heads 35 are moved by a VCM (Voice Coil Motor) 36 along radial directions of the magnetic disks 31.

The index information in the sector servo information 33 read through the magnetic heads 35 is input to the demodulator 38 acting as reading means via an amplifier 37. The demodulator 38 supplies, in series, an index demodulated signal to a shift register (SREG) 39 acting as storing means. The index demodulated signal is obtained as a result of appropriate processing, for example, performing level comparison on the input index information.

The SREG 39 holds the supplied index demodulated signal item by item and supplies it as a 4-bit signal (n, n−1, n−2, n−3) to a decoder 40 acting as determining means. The decoder 40 is formed of, for example, a logical circuit of AND gates (see FIG. 9A), and outputs an index pulse when the supplied 4-bit signal agrees with an index pattern for index detection (which will be described later).

The amplifier 37, demodulator 38, SREG 39 and decoder 40 forms an index detecting circuit 41.

Figure 6:
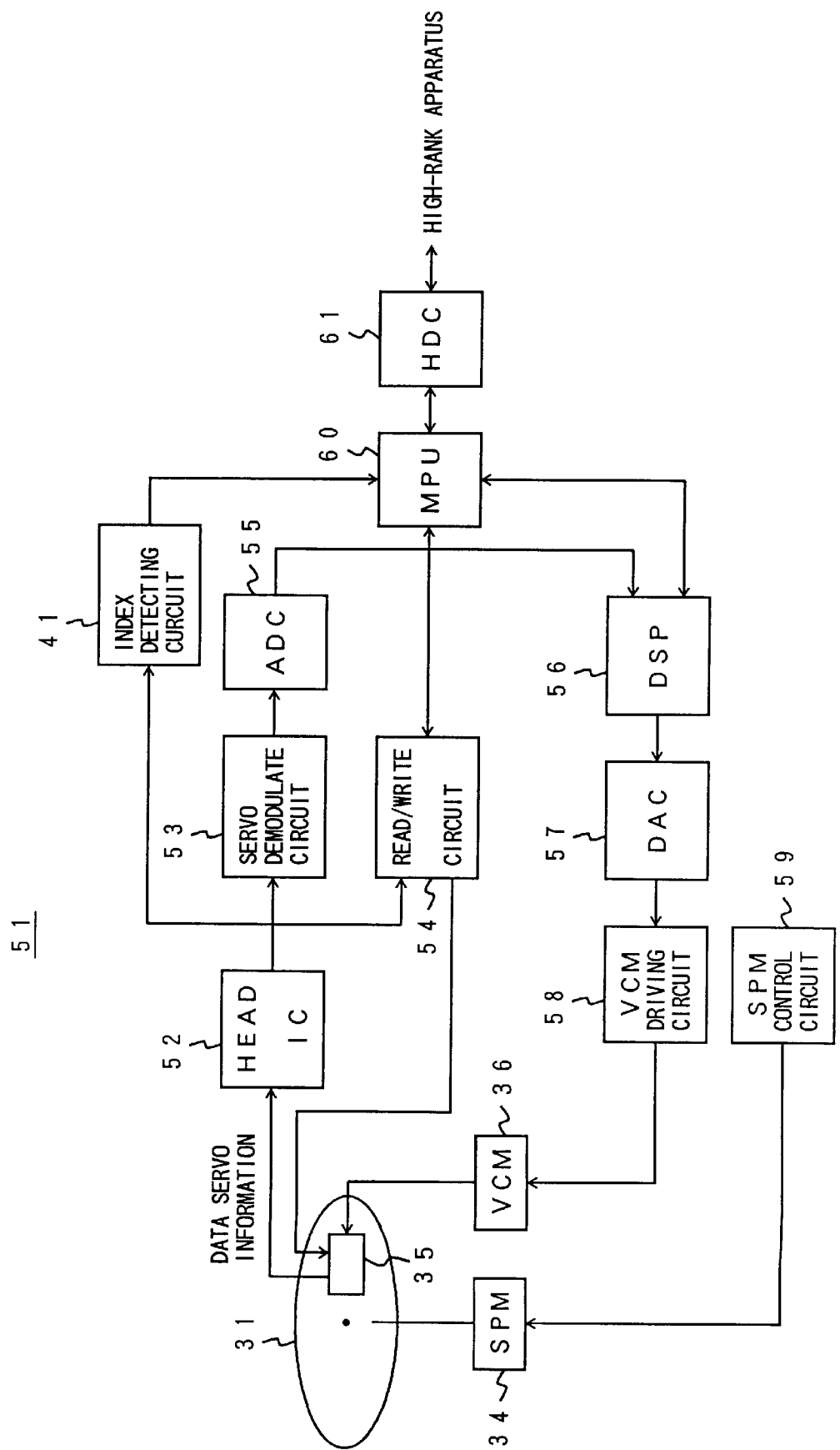
FIG. 6 shows a block diagram of a magnetic disk apparatus in the first embodiment of the present invention.

FIG. 6 shows an entire block diagram of the magnetic disk apparatus in the first embodiment of the present invention. In the magnetic disk apparatus 51 acting as a recording/reproducing apparatus, the magnetic disks 31 are rotated by the SPM 34 at a predetermined rotational speed, and the magnetic heads 35 are moved radially along the disk by the VCM 36 acting as rotation driving means.

Each of the magnetic heads 35 is, for example, a composite thin-layer magnetic head obtained as a result of combining a thin-layer head for recording data and an MR head.

Data and a servo signal (servo information) read through the magnetic heads 35 from the magnetic disks 31 are sent, via a head IC 52, to a servo demodulating circuit 53, a read/write circuit 54, and an index detecting circuit 41. The servo demodulating circuit 53 converts the servo signal to a position signal acting as position information, and sends it to an analog-to-digital converter (ADC) 55.

The ADC 55 converts the input position signal to a digital signal, and sends it to a DSP (Digital Signal Processor) 56. The DSP 56, from the sent signal, produces a digital control signal for driving the VCM 36, and sends it to a digital-to-analog converter (DAC) 57. The DAC 57 converts it to an analog control signal and sends it to a VCM driving circuit 58. Thereby, the VCM 36 is driven. Further, an SPM control circuit 59 is used in rotating the SPM 34 at a fixed speed.

The read/write circuit 54 sends the read data to an MPU (Micro Processor Unit) 60, and receives write data from the MPU 60 to supply it to the magnetic heads. The MPU 60 is controlled by a control signal from a hard disk controller (HDC) 61, which ends various control signals to the MPU 60 according to commands from a high-rank apparatus.

Figure 1:
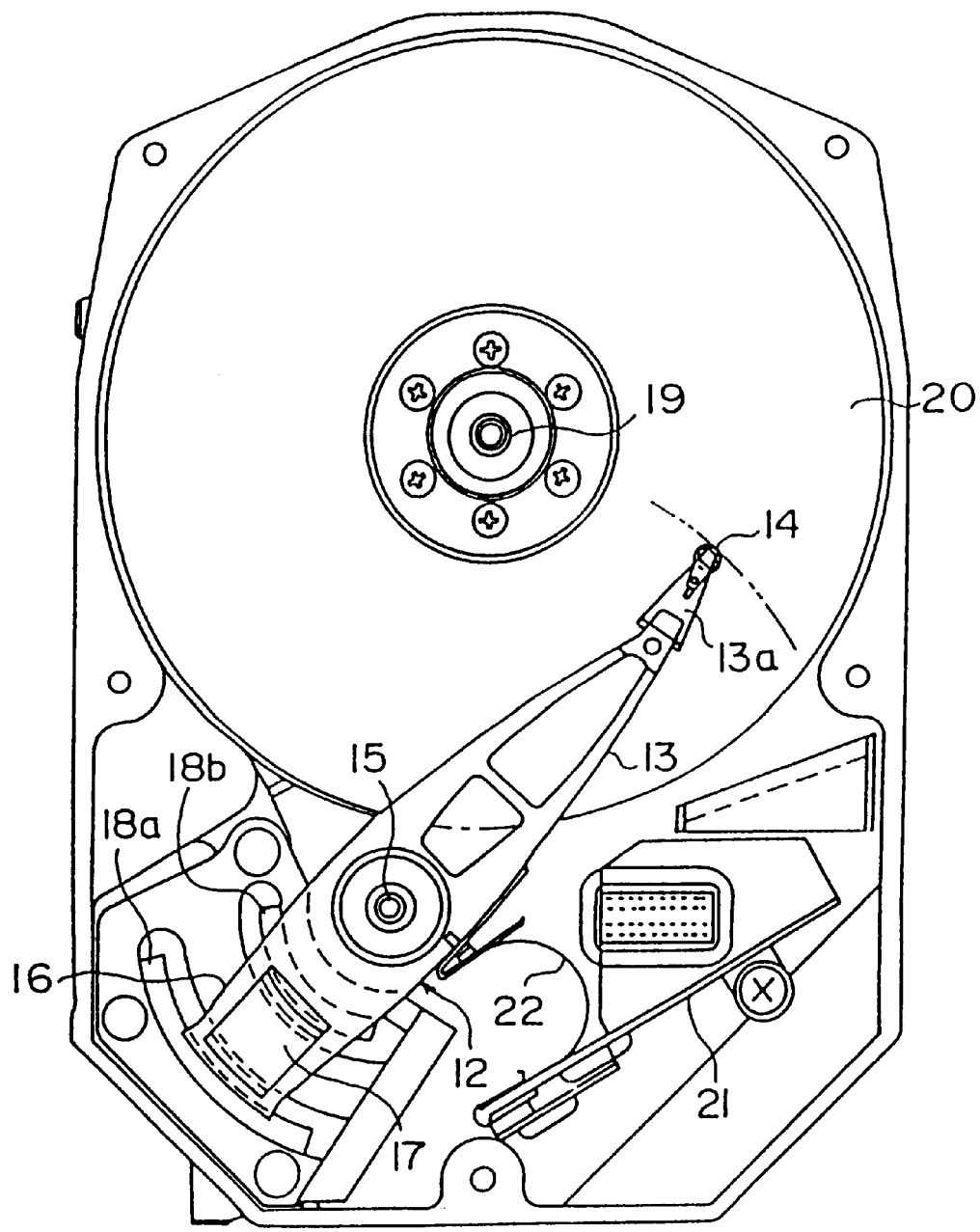
FIG. 1 shows a plan view of a magnetic disk apparatus in the related art.
Figure 2:
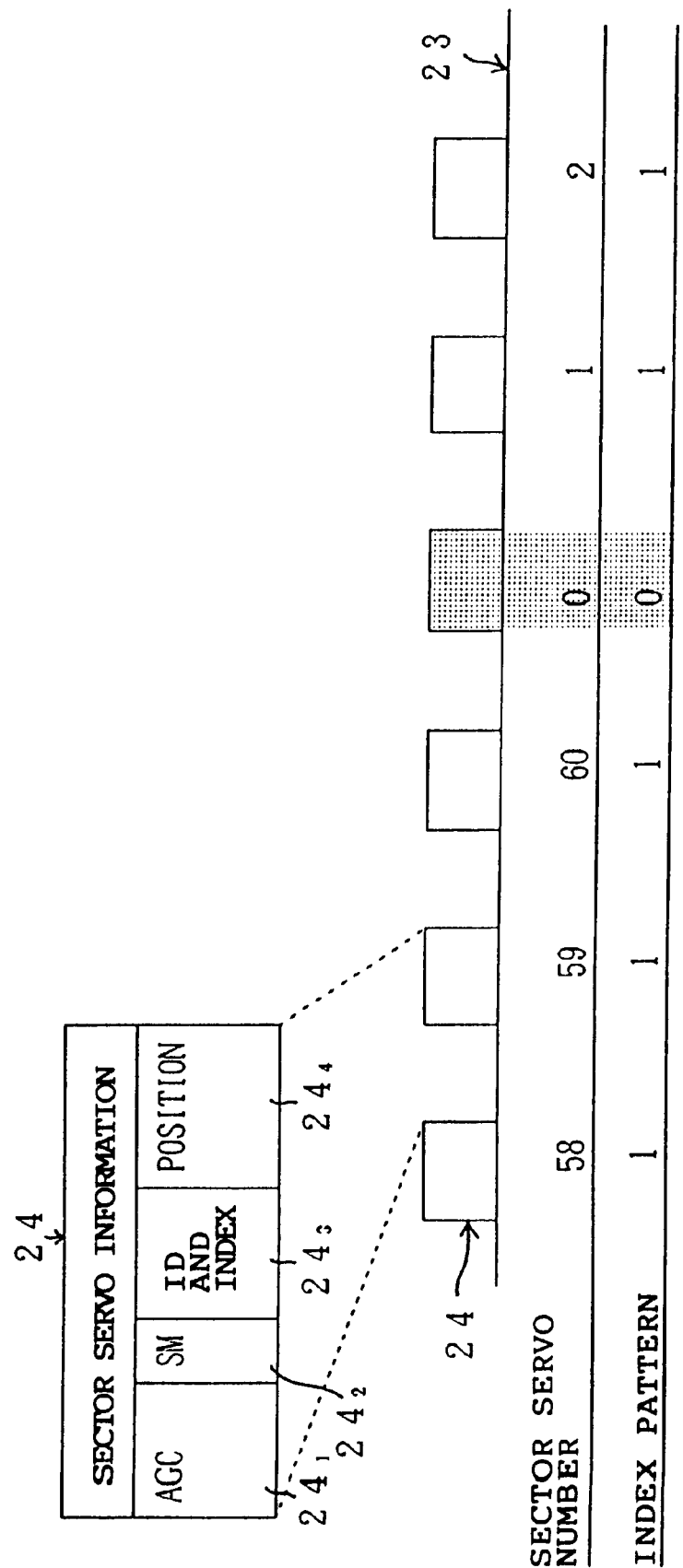
FIG. 2 illustrates index patterns recorded in a magnetic head in the related art.

A spatial arrangement in the above-described magnetic disk apparatus 51 is similar to that shown in FIG. 1.

Figure 7:
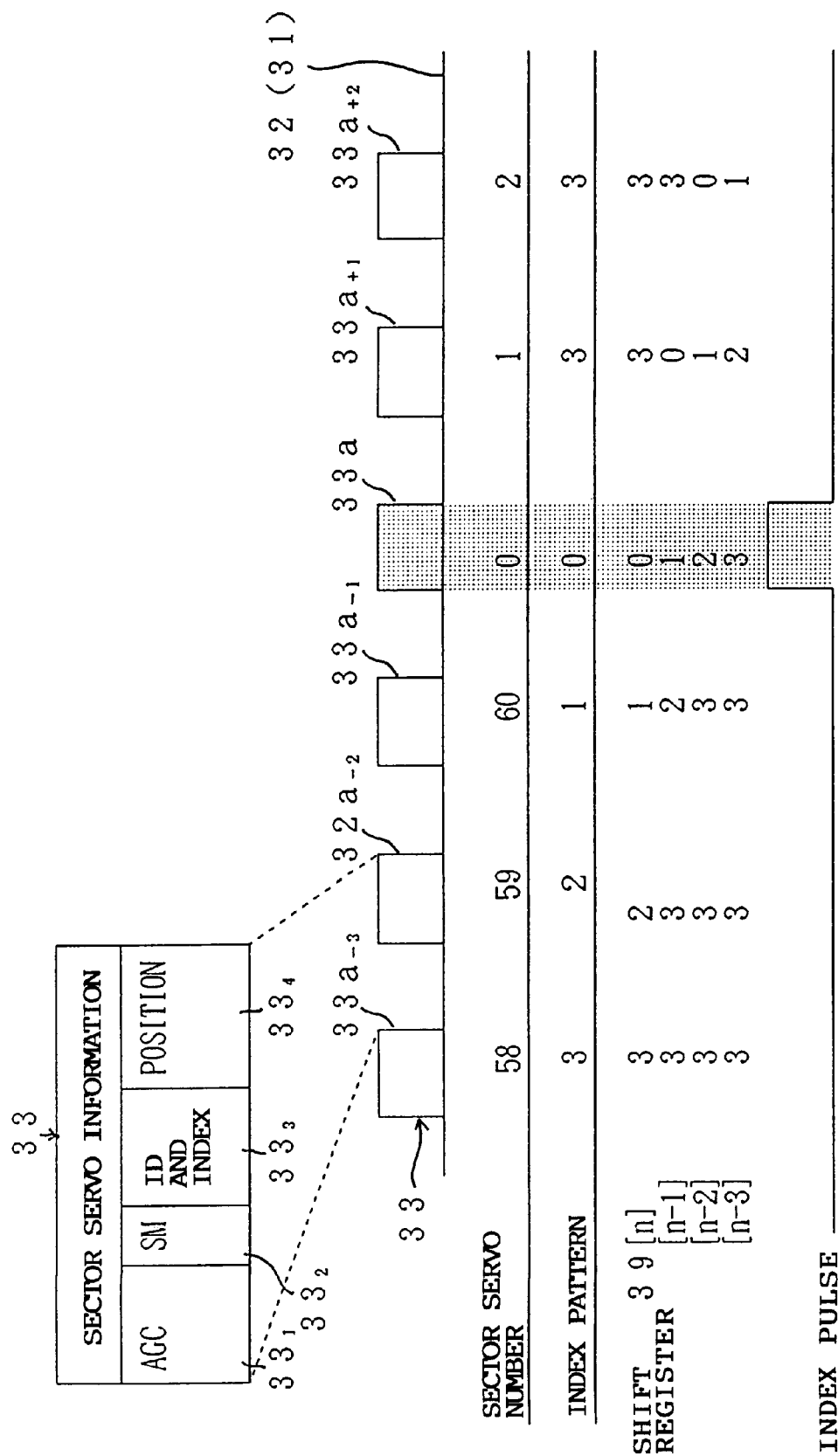

FIG. 7 illustrates index detection and FIGS. 8A, 8B, 8C, 8D and 8E illustrate an index-detecting position. The index information in the sector servo information read through the magnetic heads 35 is input as the index demodulated signal to the SREG 39 via the amplifier 37 and the demodulator 38.

When the magnetic heads 35 read the index information of the sector servo information $33a_{-3}$ of the sector servo number 58, the index signal "3" (n) is output, and also the index signal (n−1, n−2, n−3) of the preceding three items of index information are output together as shown in FIG. 8A. Thus, a signal indicating an index pattern (3, 3, 3, 3) is output to the decoder 40 from the SREG 39.

Then, when the magnetic heads 35 read the index information of the sector servo information $33a_{-2}$ of the sector servo number 59, the index signal "2" (n) is shifted, and then the SREG 39 outputs a signal of an untrue index pattern (2, 3, 3, 3) to the decoder 40 as shown in FIG. 8B.

Similarly, at the sector servo number 60, the SREG 39 outputs an untrue index pattern (1, 2, 3, 3) as shown in FIG. 8C. At the sector servo number 0, a continuous-progression index pattern (0, 1, 2, 3) is output by the SREG 39 as shown in FIG. 8D. Further, at the sector servo number 1, the SREG 39 outputs an index pattern (3, 0, 1, 2) as shown in FIG. 8E.

When the input index pattern is (0, 1, 2, 3) the decoder 40, outputs the index pulse. In other words, the index pulse is output when the magnetic heads 35 read the true index signal "0" of the sector servo number 0.

Thus, the true index can be surely detected. In fact, the index detection (detecting of the true index) is performed using not only the true index signal "0" but also the adjacent untrue index signals "1", "2", and "3" as mentioned above. Therefore, if a signal is missing such that the true index signal "0" accidentally appears at an erroneous position in the index pattern, such an erroneous true index signal can be prevented from causing the decoder 49 to supply the index pulse.

Figures 9A, 9B:
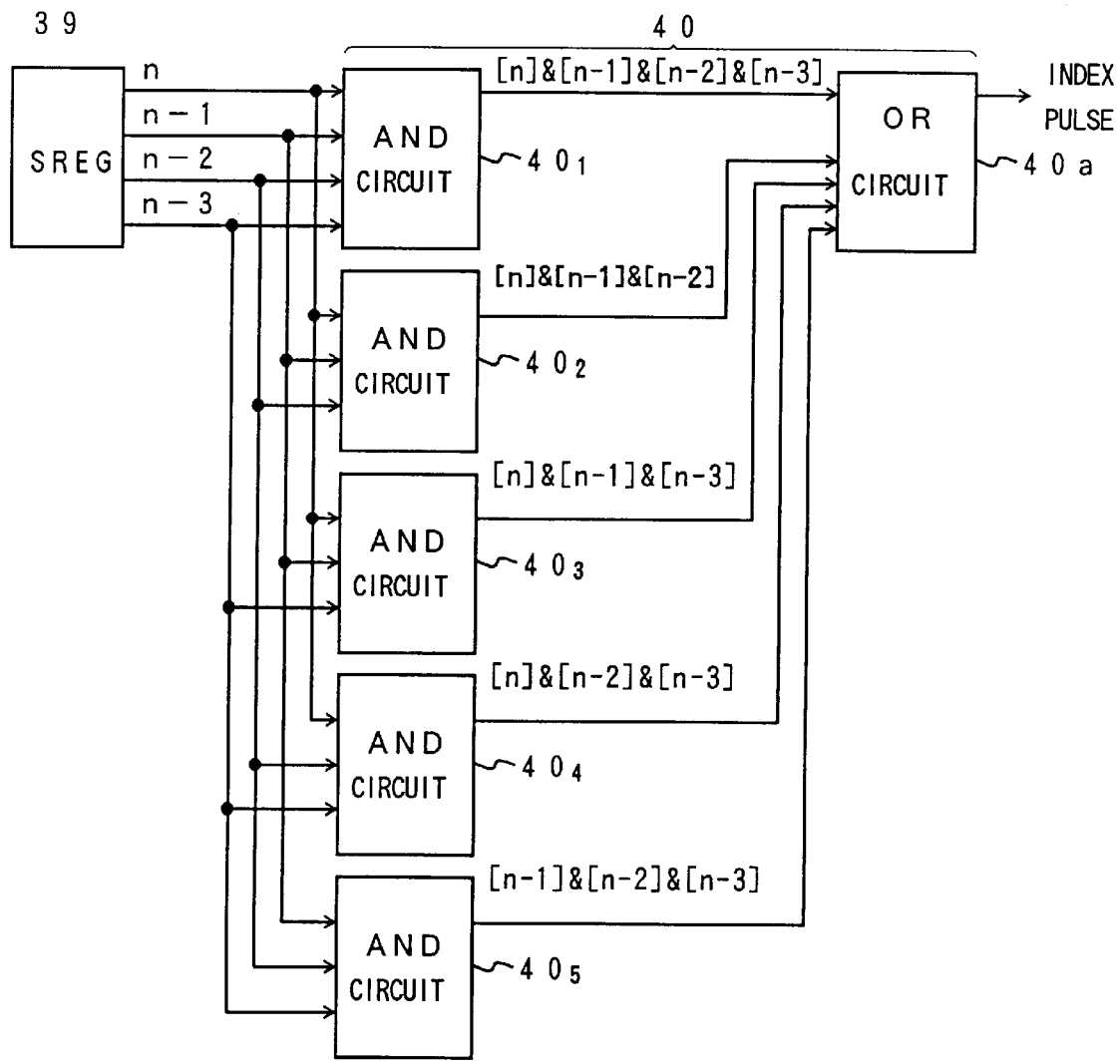
FIGS. 9A and 9B illustrate an index determining construction according to the first embodiment of the present invention.

FIGS. 9A, 9B, and 10 shows constructions for other index detection methods.

FIG. 9A shows a construction of the decoder 40 and includes five AND circuits $40_1$, $40_2$, $40_3$, $40_4$ and $40_5$, and an OR circuit 40a. Further, the decoder further includes a table 40b indicating five kinds of index detection conditions shown in FIG. 9B. The SREG 39 inputs a pattern (n, n−1, n−2, n−3) to the AND circuit $40_1$, a pattern (n, n−1, n−2) to the AND circuit $40_2$, a pattern (n, n−1, n−3) to the AND circuit $40_3$, a pattern (n, n−2, n−3) to the AND circuit $40_4$, and a pattern (n−1, n−2, n−3) to the AND circuit $40_5$.

Each of the five AND circuits $40_1$ through $40_5$ outputs an index detection signal to the OR circuit 40a when the input pattern agrees with an index pattern of a respective one of the five kinds of the index detection conditions of the table 40b shown in FIG. 9B. The OR circuit 40a outputs the index pulse when receiving the index detection signal output from at least one of the five AND circuits $40_1$ through $40_5$.

In this case, a symbol 'X' in the index detection conditions in the table 40b represents 'indefinite' (i.e., the item in this slot is irrelevant). Therefore, index detection is determined in at least one of four cases, namely, a case of a completely correct pattern (0, 1, 2, 3), and four cases of one-item-missing patterns (0, 1, 2, X), (0, 1, X, 3), (0, X, 2, 3), and (X, 1, 2, 3).

Thus, not only in the case of the completely correct pattern, but also in the four one-item-missing cases, the index detection signal is supplied to the OR circuit 40a which then outputs the index pulse. In other words, even if one of the four items "0", "1", "2", "3" of the completely correct pattern (0, 1, 2, 3) is erroneously changed to a different one, the index pulse can be output.

In the decoder 40 shown in FIG. 10, a mask register (MASK REG) 40c is provided. Except for this matter, the construction shown in FIG. 10 is the same as that shown in FIG. 9A. The MASK REG 40c is used for disabling the index detection determination in the one-item-missing cases. The MASK REG 40c supplies mask conditions to the four AND circuits 40$_2$ through 40$_5$ for one item missing of items of n, n−1, n−2, n−3 and thus the index detection determination cannot be performed in specific cases of the four one-item-missing cases.

Especially, when the power is ON in the apparatus, the position of the magnetic heads is indefinite. In a starting-up time, masking is performed for enabling the index detection determination only when the completely correct pattern (0, 1, 2, 3) is supplied. Specifically, when the power is ON, the mask register 40c supplies a low-level signal to all of the four AND circuits 40$_2$ through 40$_5$. As a result, each of these four AND circuits outputs a low-level signal. Thereby, only when the AND circuit 40$_1$ receives the completely correct pattern (0, 1, 2, 3), a high level is supplied to the OR circuit 40a which then generates the index pulse.

As a result, if a signal is missing when the power is ON, the mask register 40c prevents the index detection determination from being performed. Thus, it is possible to perform certain index detection.

In a steady operation state, the mask register 40 c, supplies a high-level signal to each of the four AND circuits 40$_2$ through 40$_5$, and thus the five kinds of the index detection conditions shown in FIG. 9B are used.

Thus, by making predetermined parts in the index pattern indefinite and masking this indefiniteness, it is possible to improve redundancy and thus the index detection margin can be improved. As a result, performance of the index detection can be improved.

In the above embodiment, a case where the index pattern ( . . . , 3, 2, 1, 0, 3, 3, . . . ) is recorded in the ID and INDEX region 33$_3$ in each of sector servo information is shown. However, the index pattern is not limited to this, and instead, for example, an index pattern ( . . . , 5, 4, 3, 2, 1, 0, 5, 5, . . . ) including a longer continuous progression (5, 4, 3, 2, 1, 0 ) can be used. Further, a numeral change when approaching the true index is not limited to the decrementing manner such that of 3, 2, 1, 0, and instead, a pattern including a numeral change in an incrementing manner, for example, ( . . . , 0, 1, 2, 3, 4, 5, 0, 0, . . . ) can be used. In this case, the index pattern corresponding to the sector number 0 is "5".

A method is disclosed in Japanese Laid-Open Patent Application No. 6-96560 for recording a non-zero-code incrementing sequence in a number of data frames prior to a relevant index frame in a servo area. In this method, for an index "7" (in a 5-bit pattern and 3-bit binary representation), an incrementing sequence "1", "2", "3", "4", . . . is recorded starting from 6 data frames prior to the index frame. Further, "0" is recorded in the other positions. In the method, by detecting the non-zero-code incrementing sequence, the index frame is detected.

However, in this disclosed method, the index frame is detected by detecting the pattern (1, 2, 3, 4, 5, 6, 7), and the pattern cannot be detected if one signal is missing of the seven numerals. Thus, redundancy is disadvantageously small.

FIG. 11 shows part of a magnetic disk apparatus 51$_A$ in a second embodiment of the present invention. In the apparatus, the magnetic disks 31 are mounted on the spindle 34a as shown in the figure, and a plurality of data areas provided on recording surfaces of the magnetic disks 31 have servo information recorded thereon. For the recording surfaces of the magnetic disks 31, the plurality of magnetic heads (HD0, HD1, . . . ) 35 are provided. Each of the magnetic heads 35 is connected to the head IC 52 which controls reading/writing operations through the magnetic heads 35.

A reproduced signal of the servo information obtained using the magnetic heads 35 is sent to a servo demodulator 53a via the head IC 52. Thus, the various servo information is demodulated. When the servo information is written in the magnetic disks 31, the index signal which is detected from the magnetic disks 31 is sent to a formatter 62. The servo demodulator 53a has a construction including components corresponding to the index detecting circuit 41, servo demodulator 53, and ADC 55 shown in FIG. 6.

The formatter 62 counts sectors using the input index signal, and produces a servo-information writing-position signal which is then sent to a head selecting circuit 63. Further, the formatter 62 sends a read/write gate signal to a read/write (R/W) controller 54. The head selecting circuit 63 selects one of the magnetic heads 35 by which the servo information is to be written, and thus causes the head IC 52 to switch heads to the selected one. The read/write controller 54 supplies the input servo information to the selected one of the magnetic heads 35 in response to the supplied read/write gate signal.

Figure 12A:
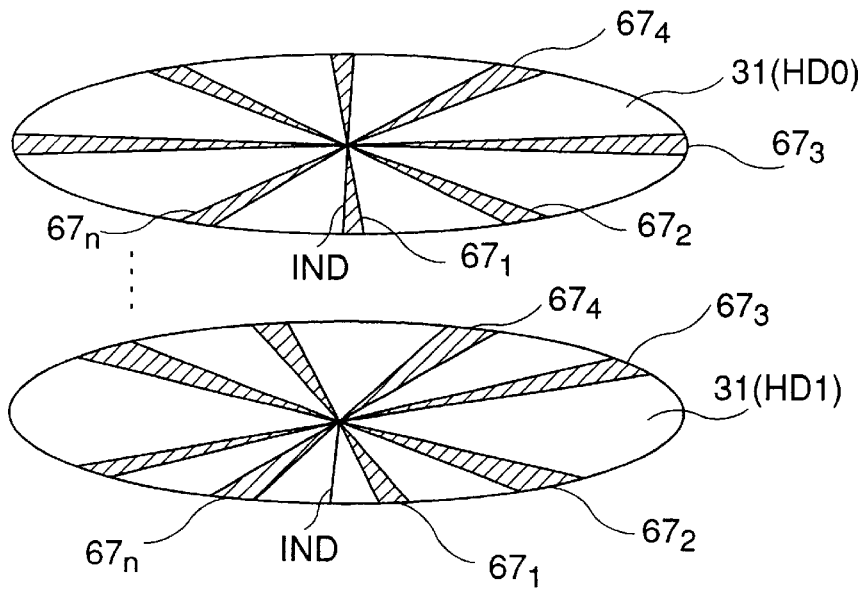
FIGS. 12A, 12B and 12C illustrate a servo-information recording manner in the magnetic disk used in the apparatus shown in FIG. 11.
Figure 12B:
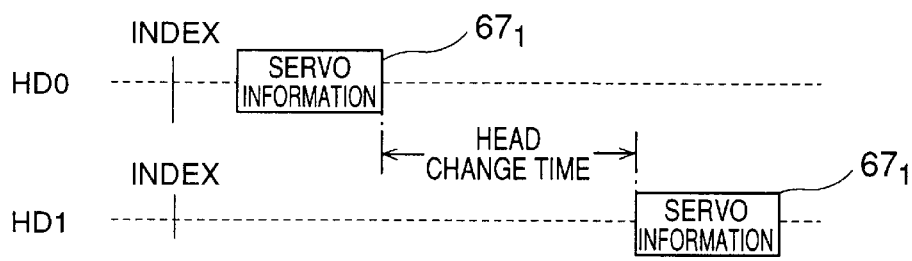
Figure 12C:
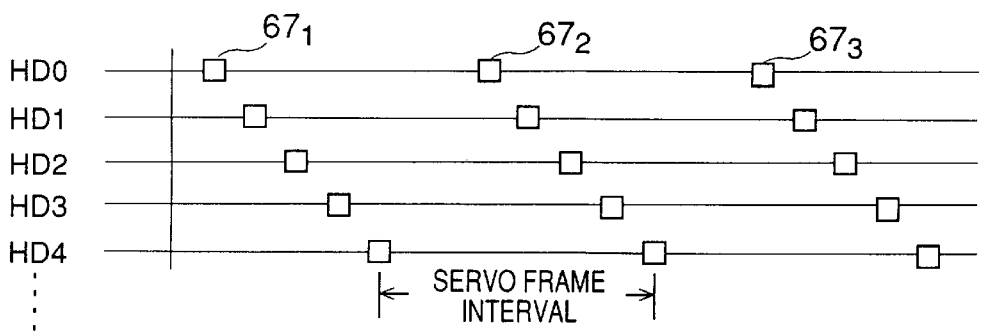

FIGS. 12A, 12B and 12C illustrate the servo-information writing by the magnetic disk apparatus shown in FIG. 11. The formatter 62 produces the servo-information writing-position signal from the index signal supplied by the servo demodulator 53a. When the servo-information writing-position signal is active, the read/write controller 54 starts writing the servo information 67$_1$ using the selected one (HD0) of the magnetic heads 35 on a relevant one of the magnetic disks 31. In the writing, as shown in FIG. 12A, the servo information 67$_1$ (which will be described later) is written from a position of the index IND.

When the writing of the servo information through the magnetic head HD0 is finished, the formatter 62 outputs a head change signal to the head selecting circuit 63, and thus, a number of a selecting head is incremented so that the selected head is changed from the HD0 to HD1. Then, the head HD1 of the magnetic heads 35 is used for writing the servo information 67$_1$ to a relevant one of the magnetic disks 31 as shown in FIG. 12A. Similarly, a selected one of the magnetic heads 35 is changed in turn to the head HDn so that all the heads of the magnetic heads 35 are used to write the servo information 67$_1$ on all the recording surfaces of the disks 31.

This writing of the servo information 67$_1$ is illustrated in FIG. 12B. As shown in the figure, after a time interval of a head change time has elapsed since the head HD0 was used for writing the servo information 67$_1$ in a relevant one of the magnetic disks 31, the head HD1 is used for writing the servo information 67$_1$ on a relevant one of the magnetic disks 31.

After all of the magnetic heads 35 (HD0 through HDn) are used for writing the servo information $67_1$, the selected one of the magnetic heads 35 is returned to the head HD0, which is then used for writing servo information $67_2$ similarly. Thus, as shown in FIG. 12C, n items of servo information $67_1$ through $67_n$, relevant to a full circle of the magnetic disks 31, are written in each recording surface of the magnetic disks 31. In this writing, the head to be used is changed among the magnetic heads 35, and a relevant item of the servo information is written for each servo frame interval. Thus, the n items of the servo information $67_1$ through $67_n$ are written in all cylinders of the magnetic disks 31 in a staggered manner. (It is noted that using the same symbol 'n' for representing the numbers does not mean that the number of the magnetic heads should have a specific relationship with the number of the items of the servo information.)

Thus, the servo-information writing using all the magnetic heads 35 (HD0 through HDn) can be performed while the magnetic disks 31 turn once or are rotated a full circle. As a result, the writing for all the cylinders can be performed in a time period resulting from multiplying the number of servo frames for each track by the number of the cylinders. Thus, it is possible to reduce the time required for recording the servo information.

Further, verification of the written servo information can be also performed by reading the written servo information as the head to be used is similarly changed among the magnetic heads.

The time interval of the head change time shown in FIG. 12B may be determined using a counter or the like. In this case, the time interval is determined such that all the head changes are completed within the servo frame interval shown in FIG. 12C.

Figure 13:
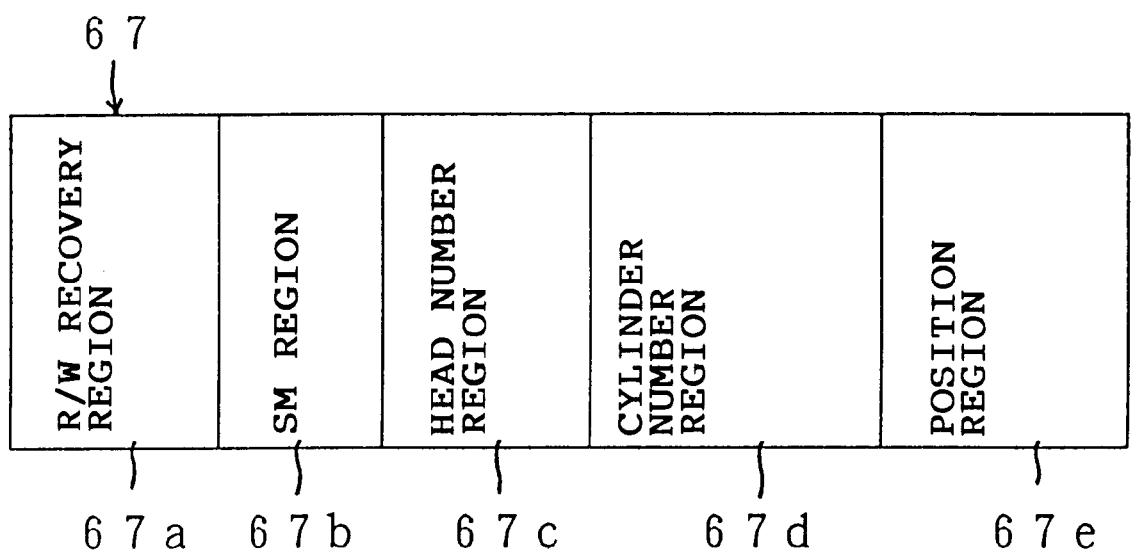
FIG. 13 shows an example of the servo information.

An example of the servo information to be written is shown in FIG. 13. As shown in the figure, The servo information 67 (each of $67_1$ through $67_n$) includes, for example, a read/write (R/W) recovery region 67a, a servo mask (SM) region 67b, a head number region 67c, a cylinder number region 67d, a position (position information) region 67e, and so forth. A head number (indicating one of HD0 through HDn) of the head number region 67c is appropriately updated when relevant servo information is written to a relevant magnetic disk. The updating is performed such that when writing, the read/write circuit 54 shown in FIG. 11 receives the relevant servo information, replaces a head number of the head number region of the relevant servo information with a subsequent head number, and then re-forms the relevant servo information including the replaced head number. The reformed servo information is then written in the relevant magnetic disk.

Figure 14:
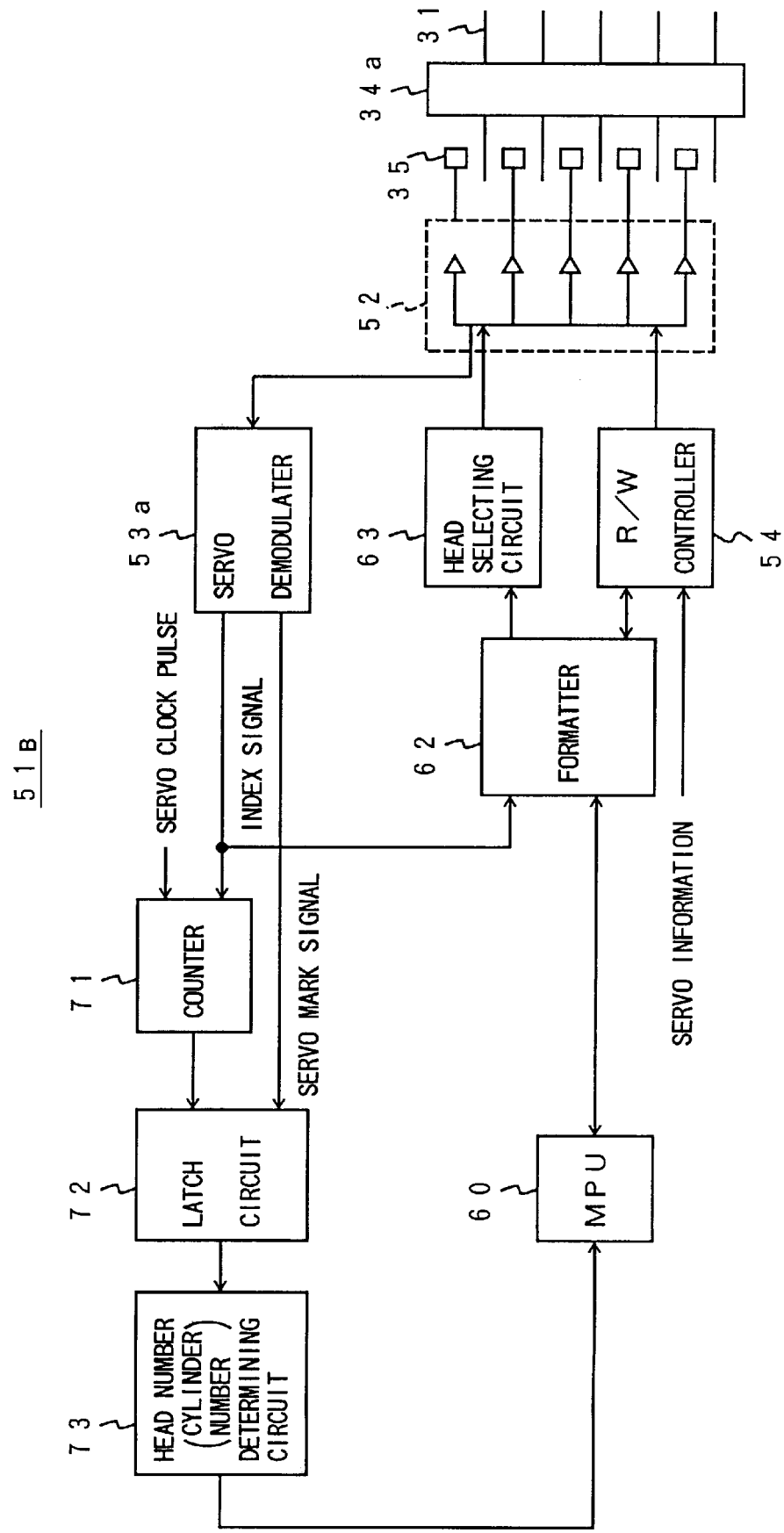
FIG. 14 shows part of a magnetic disk apparatus in a third embodiment of the present invention.

FIG. 14 shows part of a magnetic disk apparatus $51_B$ in a third embodiment of the present invention. In this apparatus, the index signal from the servo demodulator 53a is sent to a counter 71 as well as to the formatter 62. Servo clock pulses are also input to the counter 71 which then counts the servo clock pulses after the index signal is input (that is, after the true index is reached). A latch circuit 72 holds a resulting count number of the counter 71 in response to a servo mark signal from the servo demodulator 53a. A head number determining circuit 73, acting as head number determining means, is used for determining the head number from an output of the latch circuit 72. The other construction is the same as that of the construction shown in FIG. 11. The head number determined by the head number determining circuit 73 is sent to the MPU 60. A head number table 74 (see FIG. 16) is provided with the head number determining circuit 73.

A cylinder number determining circuit, acting as cylinder number determining means, which will be described in a description of a fourth embodiment of the present invention) may be provided with the head number determining circuit 73.

In the above-described case in which the head number (cylinder number) is determined as a result of appropriately counting the servo clock, the head number region 67c (cylinder number region 67d) in the servo information shown in FIG. 13 may be omitted accordingly.

Figure 15A:
FIGS. 15A, 15B, 15C, 15D, 15E and 15F illustrate a head-number determining operation in the apparatus shown in FIG. 14.
Figure 15B:
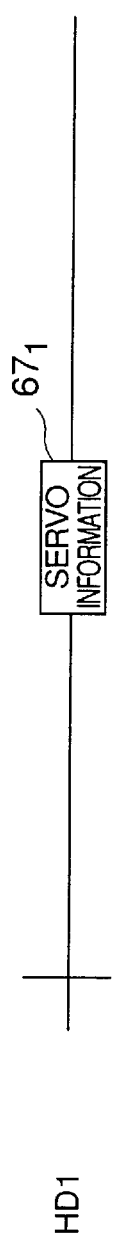
Figure 15C:
Figure 15D:
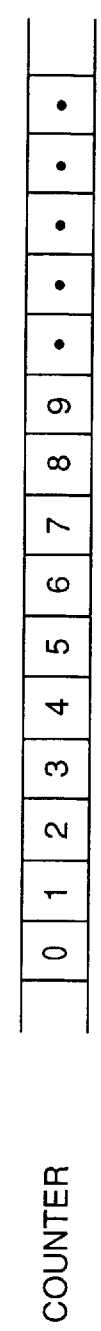

FIGS. 15A, 15B, 15C, 15D, 15E and 15F illustrate the head number determination in the third embodiment. FIGS. 15A through 15F show a case where heads HD0 and HD1 are used for reading the servo information $67_1$ shown in FIGS. 15A and 15B previously written on the relevant magnetic disk recording surfaces. The counter 71 starts counting the servo clock pulses shown in FIG. 15C after the index signal is input (that is, after the true index is reached). The resulting count numbers of the counter 71 are shown in FIG. 15D. The count numbers are sent to the latch circuit 72 in series which holds one of the count numbers when the servo mark signal in the servo information $67_1$ is input. The held count number is supplied to the head number determining circuit 73.

Figure 15E:
Figure 15F:

The head number determining circuit 73, using the head number table 74 shown in FIG. 16, compares the supplied count number with determining position numbers in the head number table 74. The head number table 74 includes the determining position numbers 2, 6, . . . , m which indicate the count numbers relevant to head numbers 0, 1, 2, . . . , n of the heads HD0, HD1, HD2, . . . , HDn. Therefore, the head number determining circuit 73 determines that the servo information currently being read is information which is read through the head HD0 when the supplied count number is "2" as shown in FIG. 15E. Similarly, the head number determining circuit 73 determines that the servo information currently being read is information which is read through the head HD1 when the supplied count number is "6" as shown in FIG. 15F.

Thus, the determination of a head, through which the servo information is being currently read, can be achieved without requiring the head number region 67c to be included in the servo information 67. As a result, it is possible to reduce an information amount required for the servo information 67, and thus to improve performance of the magnetic disk apparatus.

Figure 17A:
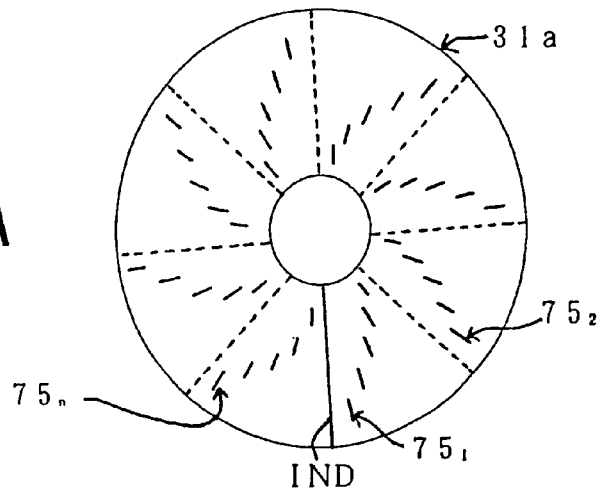
FIGS. 17A and 17B illustrate a servo-information recording manner in the magnetic disk used in a magnetic disk apparatus in a fourth embodiment of the present invention.
Figure 17B:
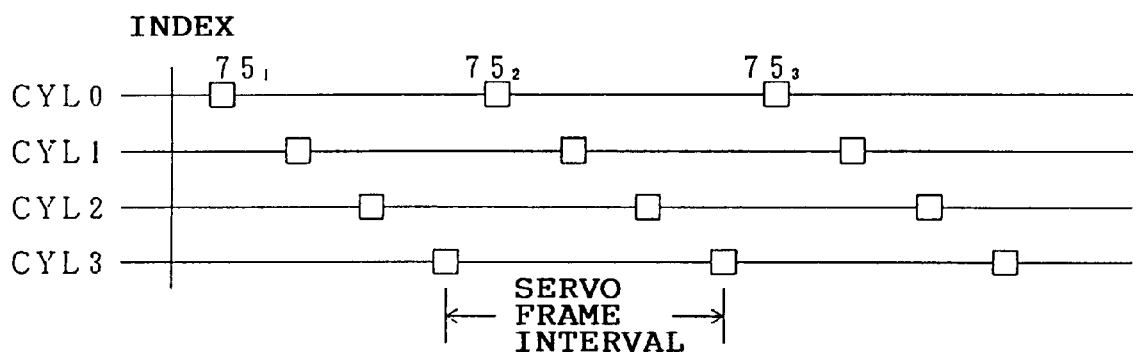

A magnetic disk apparatus in a fourth embodiment will now be described. FIG. 17A shows a general arrangement of data-area servo information $75_1$ through $75_n$ written on a recording surface of magnetic disks 31a. As shown in the figure, n items of the data-area servo information $75_1$ through $75_n$ are written in each of n+1 cylinders CYL0 through CYLn. (It is noted that using the same symbol 'n' for representing the numbers does not mean that there should be a specific relationship between the number of the magnetic heads, the number of the items of the servo information, the number of the items of the data-area servo information, and the number of the cylinders.) The n+1 cylinders are concentrically arranged in the magnetic disks 31a. As shown in FIG. 17A, each item of the n items of the data-area servo information $75_1$ through $75_n$ is written radially in a staggered manner. In other words, as shown in FIG. 17B, each item of the n items of the data-area servo information $75_1$ through $75_n$ is written in the staggered manner for all the cylinders CYL0 through CYLn within a servo frame interval.

The magnetic disk apparatus in the fourth embodiment includes a similar construction to that of the third embodiment shown in FIG. 14. In the fourth embodiment, a cylinder number determining circuit 73 is provided instead of the head number determining circuit 73. Cylinder numbers 0 through n of the cylinders CYL0 through CYLn are determined by the cylinder number determining circuit 73. A cylinder number table 76 (see FIG. 19) is provided with the cylinder number determining circuit 73. In this embodiment, the cylinder numbers are determined by the cylinder number determining circuit 73. Therefore, the cylinder number region 67d in the servo information shown in FIG. 13 may be omitted.

FIGS. 18A, 18B, 18C, 18D, 18E and 18F illustrate the cylinder number determination in the fourth embodiment. FIGS. 18A through 18F show a case where the servo information $75_1$ is read from cylinders CYL0 and CYL1 in which, as shown in FIGS. 18A and 18B, the servo information $75_1$ was previously written. The counter 71 starts counting the servo clock pulses shown in FIG. 18C after the index signal is input (that is, after the true index is reached). The resulting count numbers of the counter 71 are shown in FIG. 18D. The count numbers are sent in series to the latch circuit 72 which holds one of the count numbers when the servo mark signal in the servo information $75_1$ is input. The held count number is supplied to the cylinder number determining circuit 73.

The cylinder number determining circuit 73, using the cylinder number table 76 shown in FIG. 19, compares the supplied count number with determining position numbers in the cylinder number table 76. The cylinder number table 76 includes the determining position numbers 2, 6, . . . , m which indicate the count numbers relevant to cylinder numbers 0, 1, 2, . . . , n of the cylinders CYL0, CYL1, CYL2, . . . , CYLn. Therefore, the cylinder number determining circuit 73 determines that the servo information currently being read is information which is read from the cylinder CYL0 when the supplied count number is "2" as shown in FIG. 18E. Similarly, the cylinder number determining circuit 73 determines that the servo information currently being read is information which is read from the cylinder CYL1 when the supplied count number is "6" as shown in FIG. 18F.

Thus, the determination of a cylinder, from which the servo information is currently being read, can be achieved without requiring the cylinder number region 67d to be included in the servo information 67. As a result, it is possible to reduce an information amount required for the servo information 67, and thus to improve performance of the magnetic disk apparatus.

In each of the above-described third and fourth embodiments, the determination of the head number and cylinder number is not limited to that using the tables 74 and 76. It is also possible to determine them by appropriately calculating using the count number.

Further, the determination of the head number and cylinder number is not limited to that counting after the index signal is input (that is, after the true index is reached). It is also possible to determine the head number and cylinder number as a result of measuring the time required for reaching another objective item of servo information. For example, in a case where items of servo information are written in a time interval of 'T' and the servo frame interval is 'a', if a time of T+a is required for reaching another objective item of servo information, it can be determined that the head number (cylinder number) is incremented. Thus, it is possible to determine the head number and cylinder number.

Figure 20:
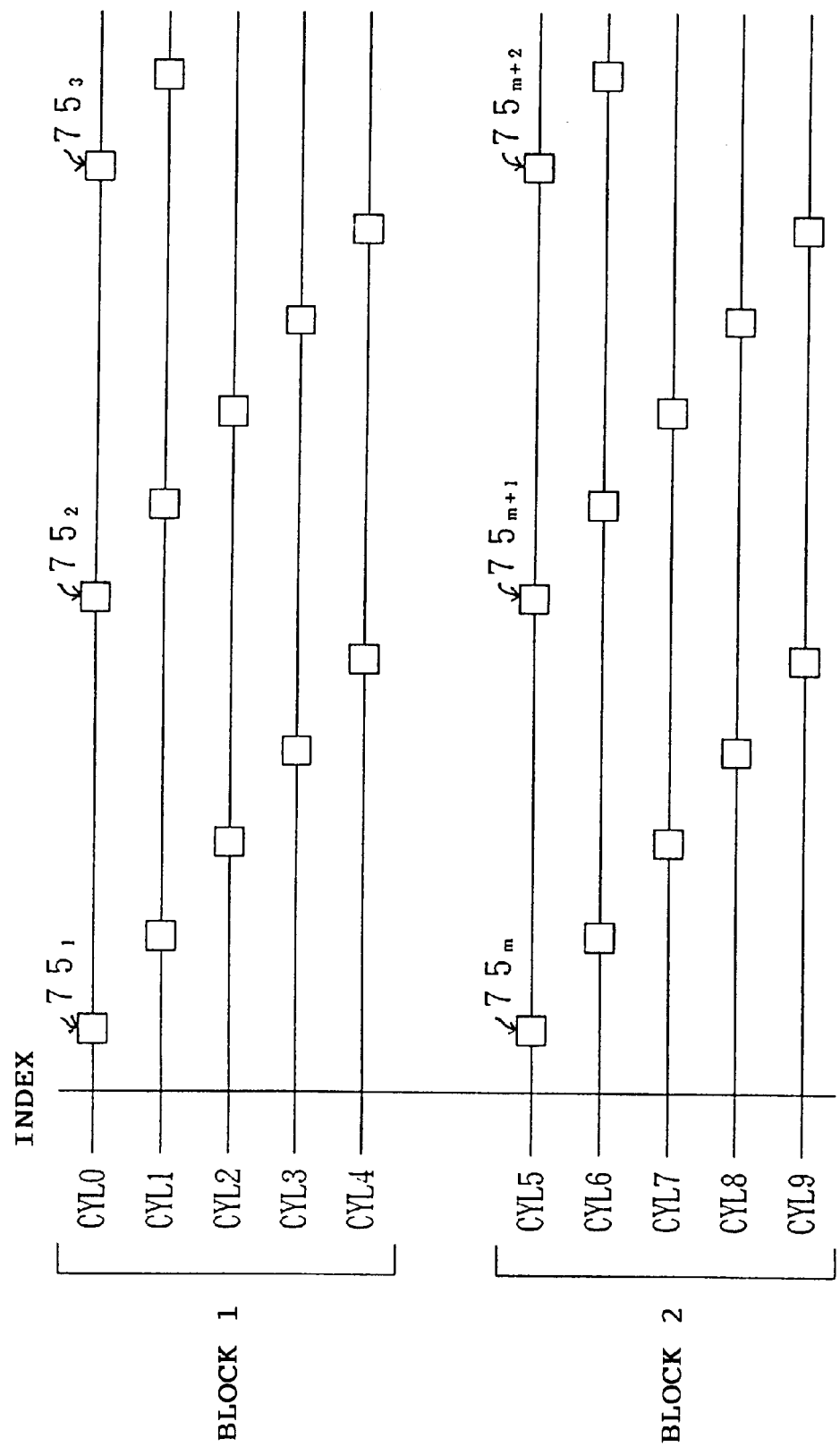
FIG. 20 illustrates a servo-information recording manner in the magnetic disk used in a variant of the fourth embodiment of the present invention.

FIG. 20 shows a servo information arrangement written in the cylinders of magnetic disks for illustrating a variant of the above-described fourth embodiment of the present invention. In this arrangement, 5 cylinders CYL0 through CYL4 are predetermined to belong to a block 1, and 5 cylinders CYL5 through CYL9 are predetermined to belong to a block 2. For the block 1, as shown in FIG. 20, items of the servo information $75_1$, $75_2$, $75_3$, . . . are recorded in a staggered manner. Similarly, for the block 2, as shown in the figure, items of the servo information $75_m$, $75_{m+1}$, $75_{m+2}$, . . . are recorded in a staggered manner.

If the magnetic disks have a large number of cylinders, considerable time is required for reaching the last cylinder CYLn after the index signal is input (the true index is reached). As a result, formatting efficiency may be degraded. In the variant of the fourth embodiment, items of servo information are arranged as shown in FIG. 20 so as to divide a number of the items of servo information into several blocks, and to manage each block of items of servo information individually. As a result, it is possible to reduce the time required for reaching a relevant data-area servo position.

Some of the above-described embodiments are recording/reproducing apparatuses using the above-described data-area servo method. However, applications of the present invention are not limited to apparatuses using the data-area servo method. The present invention may also be applied to recording/reproducing apparatuses using the above-described servo-area servo method. Further, the present invention may also be applied to recording/reproducing apparatuses, each of which has a capability of using both the data-area servo method and servo-area servo method.

Further, the present invention is not limited to the above-described embodiments, and variations and modifications may be made without departing from the scope of the present invention.

What is claimed is:

1. A recording/reproducing apparatus comprising:

index determining means for determining that a current position in a disk medium corresponds to a true index when reaching a true index pattern of servo information recorded in said disk medium, the determination being used for reading predetermined servo information so as to perform a servo control operation of a disk reading/writing head;

said disk medium having said true index pattern in a first portion of said disk medium and also untrue index patterns of servo information in a predetermined number of second portions in proximity to said first portion along a track direction, said true index pattern and said untrue index patterns forming a predetermined sequence; and said index determining means comprising:

reading means for reading the servo information recorded in said disk medium;

storing means for storing the read servo information in series; and determining means for determining that a current position in said disk medium corresponds to said true index when the stored servo information includes a sequence which is different from said predetermined sequence by a predetermined error wherein:

said determining means comprises a plurality of comparing means:

a predetermined number of index patterns are extracted from the sequence included in the stored servo information and are input to each of said plurality of comparing means, the predetermined numbers of index patterns thus extracted and input to respective ones of said plurality of comparing means being different from each other; and each of said plurality of comparing means compares the thus-input plurality of index patterns with predetermined reference patterns, and, when a result of the comparison of at least one of said plurality of comparing means is such that the input plurality of index patterns agree with the predetermined reference patterns, said determining means determines that the current position in said disk medium corresponds to said true index.

2. The recording/reproducing apparatus according to claim 1, wherein said predetermined sequence comprises an arithmetic progression formed of numbers represented by said true index pattern and said untrue index patterns.

3. The recording/reproducing apparatus according to claim 1, wherein said determining means determines that a current position in said disk medium corresponds to said true index when the stored servo information includes a sequence which is equal to said predetermined sequence.

4. The recording/reproducing apparatus according to claim 1, wherein said determining means determines that a current position in said disk medium does not correspond to said true index when the stored servo information includes a sequence which is different from said predetermined sequence by a predetermined error.

5. The recording/reproducing apparatus according to claim 1, wherein said determining means comprises a table which stores conditions to be used for determining that a current position in said disk medium corresponds to said true index when the stored servo information includes sequences, each of which is different from said predetermined sequence by a predetermined error.

6. The recording/reproducing apparatus according to claim 1, wherein said determining means comprises means for inputting the serially stored servo information in parallel.

* * * * *